United States Patent [19]

Devos et al.

[11] 4,382,962
[45] May 10, 1983

[54] SUGARLESS-TYPE CHEWING GUM

[75] Inventors: Francis Devos, Merville; Guy Bussière, La Gorgue; Michel Huchette, Merville, all of France

[73] Assignee: Societe Roquette Freres, Lestrem, France

[21] Appl. No.: 157,159

[22] Filed: Jun. 6, 1980

[30] Foreign Application Priority Data

Jun. 15, 1979 [FR] France .................. 79 15479

[51] Int. Cl.³ .............................................. A23G 3/30
[52] U.S. Cl. .......................................... 426/3; 426/658
[58] Field of Search ................................. 426/3-6, 426/548, 658

[56] References Cited

U.S. PATENT DOCUMENTS

| 3,352,689 | 11/1967 | Bilotti | 426/3 |
|---|---|---|---|
| 3,655,866 | 4/1972 | Bilotti | 426/3 |
| 4,156,740 | 5/1979 | Glass et al. | 426/5 |
| 4,248,895 | 2/1981 | Stroz et al. | 426/3 |
| 4,250,196 | 2/1981 | Friello | 426/5 |
| 4,279,931 | 7/1981 | Verwaerde et al. | 426/548 |

FOREIGN PATENT DOCUMENTS

| 715793 | 10/1968 | Belgium | 426/3 |
|---|---|---|---|
| 2382863 | 10/1978 | France | 426/3 |
| 2396514 | 2/1979 | France | 426/3 |
| 2000674 | 1/1979 | United Kingdom | 426/5 |

Primary Examiner—Jeanette M. Hunter
Attorney, Agent, or Firm—Larson and Taylor

[57] ABSTRACT

The invention relates to noncariogenic and sugarless chewing gum, and a process for manufacturing it.

The chewing gum according to the invention is constituted by gum, by an aqueous softening agent and by one or several solid sweetening agents, of which notably mannitol, wherein the aqueous softening agent is at least partly constituted by a hydrogenated starch hydrolysate containing:
less than 3% of polyols of DP higher than 20,
less than 60% of maltitol (DP 2) and
less than 19% of sorbitol (DP 1), the balance to 100 being constituted by a mixture of polyols of DP 3 to 20, the content of the final chewing gum in hydrolysate being from 5 to 35% in weight, preferably from 10 to 30% by weight, whereas its mannitol content decreases when the content of hydrolysate increases.

2 Claims, No Drawings

SUGARLESS-TYPE CHEWING GUM

The invention relates to improvements in or to conventional "sugarless" chewing-gums, that is to say to chewing-gums or gums for chewing of the type prepared by carrying out successively:

the melting of the base gum, the mixing of this base gum with an aqueous softening agent, the addition to this mixture of one or several solid sweetening agents such as sorbitol, xylitol or mannitol and one or several flavoring, and the rolling of the dough so obtained, followed by putting it into the desired shape.

The expression "chewing-gum" means not only chewing-gums proper but also chewing-gums which are of the blowable type or "bubble-gums" and those which have an inner filling.

In "sugarless" chewing-gums, the above-mentioned sweeteners, namely sorbitol, xylitol and mannitol, replace conventional saccharose.

The first sweetener other than saccharose to have been proposed for "sugarless" chewing-gums is sorbitol powder of fine granulometry.

Sorbitol is at present the most often used and the invention particularly relates to conventional "sugarless" chewing-gums prepared with sorbitol powder as principal sweetening agent.

It is found that if, especially from the point of view of combatting dental decay caused notably by the saccharose, the replacement of the latter by sorbitol has been beneficial, this is not the same from the standpoint of the "behaviour" in time of chewing-gum of this type considering the crystalline transformations that the sorbitol powder of unstable form undergoes in its change into the stable form. These transformations occur notably under the effect of the mechanical action of kneading and rolling at the time of manufacturing the chewing-gum which takes place at temperatures about 60° C. and at hydration rates about 5%, these crystalline transformations being manifested by a caking with recrystallization at the surface.

Even the use of powdered sorbitol of the stable form, for example that prepared by reducing to practice the method which is the subject matter of British Pat. No. 1,481,846, if it excludes in fact the above-mentioned transformation and eliminates the drawbacks resulting therefrom, it alone does not enable the drawbacks shown by conventional "sugarless" chewing-gums to be remedied.

Conventional "sugarless" chewing-gums have a final humidity of 5% by water. This humidity is traditionally brought either by the addition of about 15% of liquid sorbitol with 70% of dry matter, or by the addition of aqueous solutions of vegetable gums.

In the first case, this contribution of 5% of water by the incorporation of liquid sorbitol gives the product, at 60° C., good properties of malleability and enables mixing and rolling without excessive sticking. However, this water not being bound, the liquid sorbitol crystallizes gradually thereby releasing the water incorporated under the effect of the powerful mechanical actions and the temperature, and due to the fact of the presence of a high percentage of powdered sorbitol. This is manifested by hardening of the dough in the course of the kneading and by great difficulty during rolling.

The finished articles are in the form of strips which are hard and breakable to the teeth. Moreover, under the alternate action of dry and humid climates, the chewing-gums exhibit considerable phenomenon of surface crystallization, still lose their suppleness and their flexibility as well as their fragrance and their freshness.

In the second case, that is to say in the case of the addition of aqueous solutions of vegetable gums, the same phenomena appear. The high viscosity of these gums does not enable moreover their incorporation in sufficient proportions; on the other hand, the water is still insufficiently bound therein.

It has also been proposed to overcome these difficulties by incorporating, as hydrating and stabilizing agents, glycerine or glycols. Now, it happens that beyond the incorporation of about 10% of these substances in the dough, this proportion being sufficient to give good plasticity during kneading, taste problems arise as well as difficulties due to softening during the rolling.

In addition, the high hygroscopicity of these substances necessitates the use of moisture-resistant packages, and on the other hand, the phenomena of surface crystallization of the sorbitol powder, although they are slightly decreased, remain when glycerine or glycols are used.

These serious faults, recrystallization at the surface, hardening on storage, loss in masticability, notably inherent in the too high "fugacity" of the water in these various formulations, have however been somewhat attenuated by the incorporation of mannitol. Mannitol is an isomer of sorbitol, is a very stable and high melting point substance and shows in particular, very low solubility and a low hygroscopicity. Mannitol is thus used in addition to sorbitol powder. Under the influence of a moist atmosphere, the water reabsorption at the surface is very low and the resolubilization of the solid phase is highly attenuated, due to the fact of the very low solubility of the mannitol.

It is also used for the powdering of surface, in the amount of about 1 to 4% by weight of the total mass of the chewing-gum, when the latter is finished.

Hereafter, the word mannitol only relates to mannitol used for the constitution of chewing-gum and not to the one used outside from powdering.

It results therefrom that the majority of present sugarless chewing-gums contain relatively high proportions of mannitol.

These rates are generally around 10 to 15% and can even reach 20%, principally when the solid sweetener consists of sorbitol powder and the aqueous softening agent is constituted by liquid sorbitol.

Now, mannitol is rather expensive, has a rather low sweetening power and possesses an almost zero momentary freshness, by reason of its low solubility. On the other hand, the use of mannitol, if it enables to attenuate the principal defects explained previously, does not however eliminate them completely. The chewing-gums thus constituted remain therefore friable and their plasticity can be improved; lastly, the aromas and flavors lose their intensity on storage due to the fact that the water is not yet sufficiently bound in the final product.

The improvements contributed by the invention enable all of these drawbacks to be overcome.

The applicant company has found that, unexpectedly and surprisingly, the fact of constituting, in a conventional chewing-gum whose composition is above recalled, the aqueous softening agent at least partially by certain hydrogenated starch hydrolysates, would confer on the conventional sugarless chewing-gums a stability such that it enables the incorporation of mannitol to be reduced very significantly in the solid sweetening phase whilst overcoming all the previously explained faults; the chewing-gums so obtained, besides their excellent stability, thus have a greater sweetening power, better plasticity, better flavoring and aroma retention as well as complete resistance to the acidifying action of the bacteria of the mouth, the incorporation of a sufficient proportion of the above-said hydrolysates enabling the mannitol to be even entirely eliminated.

It has also found that, unexpectedly, the filling, in the case of filled chewing gums, could be constituted for the essential part by the same hydrogenated starch hydrolysate.

The improvements according to the invention consist therefore of including, both in conventional sugarless chewing-gums and the filling that they may possibly contain, an effective amount of a hydrogenated starch hydrolysate as defined below.

The invention is directed to the corresponding possibly filled sugarless conventional chewing-gum, the process for obtaining said chewing-gum and the above-mentioned hydrogenated starch hydrolysates in their application to the constituting of said chewing-gum.

Conventional non-cariogenic, stable "sugarless" chewing-gum, with high sweetening power according to the invention is characterized by the fact that the aqueous softening agent being part of its composition is at least partially constituted by a hydrogenated starch hydrolysate defined below, the final chewing-gum containing from 5 to 35% thereof, preferably from 10 to 30% by weight, the mannitol content of the final chewing-gum being decreasing concomitantly, and this content possibly tending towards 0, even being 0 when the proportion of hydrolysate is higher than 20% by weight.

More particularly, the content of mannitol is:

less than 10% by weight when the hydrolysate content is higher than 10% by weight, less than 5% by weight when the hydrolysate content is higher than 15% by weight, and about 0 or even nul when the hydrolysate content is higher than 20% by weight.

The above-said chewing-gum is also characterized by the fact that, when it comprises a filling, the latter is constituted at least partially, preferably in the proportion of at least 70% by weight, by the above-said hydrolysate.

The above-said hydrolysate contains less than 3% of polyols of DP (degree of polymerization) higher than 20, less than about 60% of maltitol (DP 2) and less than about 19% of sorbitol (DP 1), the percentages being expressed with respect to the dry matter.

According to a modification, the composition of the above-said hydrolysate is less than 3% of polyols of DP higher than 20, less than about 60% of maltitol (DP 2) and less than about 14% of sorbitol (DP 1).

Advantageously, the composition of the above-said hydrolysate is as follows:

less than 3%, preferably less than 1.5% by weight of products of DP higher than 20, from 0.3 to 14%, preferably from 4 to 14% by weight of sorbitol, from 45 to 60%, preferably from 50 to 53% by weight of maltitol, the balance to 100 being constituted by a mixture of polyols of DP 3 to 20.

In the above-said definitions and in the following of the description, the proportions given in figures always relate to the chewing-gum proper; when the chewing-gum includes a filling, the details concerning the composition of the latter are specially indicated.

The manufacturing process according to the invention of the above-said chewing-gum is characterized by the fact that recourse is had, as a constituent at least partial of the aqueous softening agent being part of its composition, to the above-defined hydrogenated starch hydrolysate.

More particularly, this process is characterized in that the above-said hydrolysate is added to the base gum brought to the molten state in an amount such that the final chewing-gum corresponds to the above-indicated definition.

In the case of chewing-gums including an inner filling, the presence of the above-said hydrogenated glucose syrups is also of great interest, due to the fact that they can be concentrated to dry matter contents of 80 to 85% without crystallization. They can hence be used as essential constituents of liquid fillings at the same time as sweeteners and moistening agents and in this case, the content of hydrogenated starch hydrolysates in the finished products can reach about 55% (the filling can be up to about 30 to 35% by weight of the finished product).

Besides the hydrogenated starch hydrolysate, the filling can include thickening agents, other moistening agents and/or other synthetic or natural sweeteners.

With regard to these other constituents, may be mentioned:

as thickening agents, for example, carboxymethylcellulose, pectin and alginates, as moistening agents, for example, propyleneglycol, glycerine and as sweeteners, for example sorbitol, xylitol, the cyclamates and the salts of saccharin.

The proportion of hydrogenated starch hydrolysate with respect to the total weight of the filling is at least 70% by weight.

The presence of a proportion of about 5 to 15% of the hydrogenated starch hydrolysates used according to the invention already enables a distinct improvement in the stability of the chewing-gums obtained but requires also the use of a relatively large amount of mannitol.

Starting from a proportion of 15%, the improvement in the stability is such that the amount of mannitol can be considerably reduced and, for incorporation ratios of 20% and more, the presence of mannitol is no longer necessary.

The remarkable stabilizing properties of the hydrogenated starch hydrolysates used according to the invention seem to be essentially due to the anti-crystallizing power and to the water-retaining power of the hydrogenated oligosaccharides and polysaccharides, present to a high percentage.

In addition, the hydrogenated starch hydrolysates used according to the present invention have the advantages:

of high sweetening power, due to the high content of maltitol, a product having a sweetening taste equivalent to about 0.75 times that of saccharose, of the absence of cariogenic character by reason of the minimal percentage of hydrogenated polysaccharides of DP higher than 20.

Due to the invention, it is hence possible to manufacture non-cariogenic conventional chewing-gums, having a sweetening power higher than that of conventional sugarless chewing-gums (mannitol, which is slightly sweetening, being replaced by hydrogenated hydrolysates of a highly sweet taste) and having a better plasticity and a better aroma and flavoring retention, these chewing-gums being distinguished by excellent stability to ageing and to the alternation of dry and humid atmospheres.

As regards the manufacture of starch hydrolysates included by the chewing-gums according to the invention, reference may be made to the British Pat. No. 7,942,592 of Dec. 11, 1979.

The process for preparing chewing-gums according to the invention is characterized by the fact that a portion at least of the aqueous softening agent used in the prior art is replaced by the above-mentioned hydrolysate.

For this manufacture, procedure may be as follows.

In a laboratory kneading mill of the D.V.M. type (manufactured by the KUSTNER Company), provided with a circulation of hot water at 70° C. the base gum is placed (for example that wich is marketed under the name FIRM PALOJA by the L. A. DREYFUS Company whose address is at 68600 NEUF-BRISACH), previously heated to a temperature of about 75° C., for example by means of a micro-oven and brought thus to the molten state.

The aqueous softening agent, constituted at least in part by the hydrolysate used according to the invention, is preheated at 75° C., then added first to the kneader, followed by solid sweeteners (powdered sorbitol and possibly powdered mannitol), flavorings and possibly the usual auxiliary manufacturing agent, these solid products being introduced in small portions in order to avoid too sudden a drop in the temperature.

The development of the kneading can be followed by means of sampling carried out after 15 minutes and then after 30 minutes. The cover of the kneader is closed so as to avoid any evaporation.

The dough so-prepared is then rolled to a thickness of 1.9 mm after standing for two hours, for example, in rollers marketed by the SEEWER A. G. Company at BRUGDORF (Switzerland), and is then cut up into tablets.

As regards the manufacture of filled chewing gum, the procedure may be one known in itself, for example that which is the subject of French Pat. No. 73 24637 of July 12, 1973.

The powdered sorbitol used in the examples which follow is that of the stable form marketed by the applicant company under the name "NEOSORB POUDRE 60." This stable sorbitol, which is manufactured according to the process described in British Pat. No. 1,481,846, has a melting point higher than 96° C., a content of the stable form higher than 95% (measured by differential thermal analysis) and a high heat of solution, resulting in a strong impression of freshness on the tongue.

The mannitol used in the following examples corresponds to pure crystalline mannitol obtained by crystallization of hydrogenated fructose solutions. It has a crystalline purity higher than 99% (measured by differential thermal analysis).

Accelerated ageing tests have been carried out on samples of unwrapped chewing-gum manufactured in this way, in order to establish their stability. To do this, the samples were placed in an oven (for example that marketed under the designation H.L.O. 250L by the "LE MATERIEL PHYSICO-CHIMIQUE" Company whose business address is at 93330 NEUILLY SUR MARNE), wherein for 48 hours the following conditions were alternately applied:

1 hour at 30° C. and 70% relative humidity,
1 hour at 38° C. and 30% relative humidity, which is equivalent to an alternation of a hot and humid climate and a hot and dry climate.

Under these conditions the chewing-gums reabsorb 2 to 5% of water in the course of the first phase and lost it again in the course of the consecutive drying.

This water, localized at the surface, causes the complete remelting of the powdered surface sorbitol, which can result, in the course of the consecutive drying, in very considerable surface recrystallization.

The invention will be still better understood by means of the examples which follow and of which certain relate to preferred embodiments.

EXAMPLE 1

Four chewing-gum manufacturing tests were carried out according to the formulae indicated in Table I below, the first three samples of the tests corresponding to the prior art, and the fourth one to the invention.

TABLE I

| Composition by weight | Sample of test No. 1 | Sample of test No. 2 | Sample of test No. 3 | Sample of test No. 4 |
|---|---|---|---|---|
| Gum (% by weight) | 25 | 25 | 25 | 25 |
| Powdered Sorbitol (% by weight) | 53 | 53 | 53 | 53 |
| Mannitol (% by weight) | 7 | 7 | 7 | 5 |
| Liquid phase (% by weight) | 15% of crystallizable liquid C70 sorbitol with 70% of dry matter | 15% of non-crystallizable liquid NC70(1) sorbitol with 70% of dry matter | 15% of non-crystallizable NC70(2) liquid sorbitol with 70% of dry matter | 9% of hydrogenated starch hydrolysate with 73.5% of dry matter plus 8% of non-crystallizable NC70(2) sorbitol with 70% of dry matter. |

The C70 liquid sorbitol used in sample of test No. 1 was obtained by hydrogenation of pure dextrose and was in the form of a solution with 70% of dry matter.

The liquid NC70 (1) sorbitol used in sample of test No. 2 was obtained by hydrogenation of a hydrolysate of a 96 DE (dextrose-equivalent) starch hydrolysate and was in the form of a solution with 70% of dry matter, contaning 64% of D-sorbitol and 6% of hydrogenated oligosaccharides.

The liquid NC70 (2) sorbitol used in the samples of tests Nos. 3 and 4 was obtained by hydrogenation of an hydrolysate of an 82 DE starch. It was in the form of a solution with 70% of dry matter containing 50% of D-sorbitol and 20% of hydrogenated oligosaccharides.

The hydrogenated starch hydrolysate used in accordance with the invention in sample of test No. 4 corresponds to the following composition:

| | |
|---|---|
| sorbitol | 8% |
| maltitol | 53.5% |
| products of DP comprised between 3 and 20 | 37.8% |
| products of DP higher than 20 | 0.7%. |

The concentration was raised to about 73.5% of dry matter in order to ensure a final humidity of the chewing-gum of about 4.5 to 5%.

The following observations were made in the course of manufacturing chewing-gum and in the course of the accelerated aging test.

Sample of test No. 1 showed a considerable hardening of the dough in the course of malaxation. This hardening was also observed in sample of test No. 2 after 30 minutes.

After rolling and accelerated aging, the specimens prepared in the course of these two samples showed considerable phenomena of surface recrystallization. These recrystallizations were localized around water evaporation chimneys, formed in the course of the drying phase. The phenomenon was slightly reduced however from Sample of test No. 1 to Sample of test No. 2.

The moisture realisation was situated at a value of 2 to 5% in the course of each hydration cycle.

These defects follow the composition of the liquid phase. When the latter is of the same nature as the solid phase, the water is not bound to the final product. In the course of the malaxation, the crystallization of the liquid sorbitol, initiated by the high-percentage of powdered sorbitol, causes a hardening of the dough, which leads to the stopping of the kneading after 15 minutes in sample of test No. 1.

Test No. 3 was able to be taken to completion. After rolling, the product showed a good texture but, after the accelerated aging test, surface recrystallization phenomena appeared.

It was also possible to take test No. 4 to completion. After rolling, the product showed good texture, close to that of the preceding test. After the accelerated aging test, surface recrystallization phenomena appeared but of lesser intensity than in test No. 3.

These tests show that the use of C70 sorbitol and of NC70 (1) sorbitol causes serious technological difficulties in the manufacture of chewing-gums and that it positively does not permit the production of stable chewing-gums.

Sorbitol NC70 (2), containing a non-negligible amount of hydrogenated oligosaccharides, brings a slight improvement in the manufacture of chewing-gums, but the latter remain however quite unstable, showing considerable recrystallization phenomena in the course of the accelerated aging test.

The use in sample of test No. 4 of 9% of hydrogenated hydrolysate according to the invention brings not only an improvement in the manufacture of chewing-gums, but also a very substantial improvement in the stability of the latter and enables a reduction in the proportion of mannitol incorporated, replaced by powdered sorbitol.

EXAMPLE 2

A series of tests was carried out (tests in which the rates of incorporation of hydrogenated starch hydrolysate varied according to the invention and correlatively the rates of mannitol addition varied.

The operational method was the same as that described in Example 1. The hydrogenated starch hydrolysate (H) and the liquid NC70 (2) sorbitol used in these tests corresponds to the same composition as those described in Example 1.

The hydrogenated starch hydrolysate (H) was incorporated in the proportion of 13, 15, 20, 20, 25 and 30% respectively in samples of tests No. 5 to No. 10. To obtan a water content close to 5% in the finished chewing-gum, the dry matter was increased, according to the rates of incorporation, to the following values.

| Rates of incorporation of hydrogenated hydrolysate | Dry Matter |
|---|---|
| 13% | 73% |
| 15% | 70% |
| 20% | 75% |
| 25% | 80% |
| 30% | 83% |

The formulation tested in these samples are gathered in Table II.

TABLE II

| Composition by weight | Sample of test No. 5 | Sample of test No. 6 | Sample of test No. 7 | Sample of test No. 8 | Sample of test No. 9 | Sample of test No. 10 |
|---|---|---|---|---|---|---|
| Gum (% by weight) | 25 | 25 | 25 | 25 | 25 | 25 |
| Powdered sorbitol (% by weight) | 53 | 56 | 53 | 55 | 50 | 45 |
| Mannitol (% by weight) | 4 | 4 | 2 | 0 | 0 | 0 |
| Liquid phase | 13%(H) + 5% NC70(2) with 70% of | 15%(H) | 20%(H) | 20%(H) | 25%(H) | 30%(H) |

TABLE II-continued

| Composition by weight | Sample of test No. 5 | Sample of test No. 6 | Sample of test No. 7 | Sample of test No. 8 | Sample of test No. 9 | Sample of test No. 10 |
|---|---|---|---|---|---|---|
| | dry matter | | | | | |

The following observations were made during the manufacture of the chewing-gums and in the course of the accelerated aging test.

Sample of test No. 5 was kneaded and rolled without any difficulty. The texture of the finished chewing gum was excellent. The accelerated aging test caused only the appearance of a slight surface crystallization.

Sample of test No. 6 was kneaded and rolled without difficulty. The texture of the finished chewing gum was similar of that of sample of test No. 5. The accelerated aging test caused only the appearance of a slight surface crystallization. By reason of the replacement of a portion of the mannitol by powdered sorbitol, the instant or momentary freshness of these specimens of chewing-gum was accentuated.

Samples of tests Nos. 7 and 8 were kneaded and rolled without difficulty. Sample No. 7, including 20% of hydrolysate and 2% of mannitol, had a complete stability and no longer showed surface crystallization, even after several successive aging tests. Sample of test No. 8, including 20% of hydrolysate and a zero content of mannitol, was also of excellent stability. From an incorporation rate of hydrogenated hydrolysate of 20%, the addition of mannitol is hence no longer necessary.

Samples of tests Nos. 9 and 10 were completely stable, having very good texture and preserving excellent suppleness to the teeth even after six months.

All these samples have shown a great ease of kneading and of rolling.

The chewing-gums obtained are fully resistant to the acidifying action of the bacterial of the mouth.

They possess a very pleasant and very particular flavor, due to the very high content of maltitol of the hydrogenated starch hydrolysate used.

Their sweetening power is higher, considering the replacement of the mannitol, which has little sweetening power, by the hydrolysate used according to the invention. The incorporation of the latter also gives to the transient (fugitive)sweetening power of the sorbitol a more persistent flavor and a more sustained "body."

EXAMPLE 3

This example relates more particularly to the manufacture of chewing-gum with filling.

With the chewing-gum manufactured according to the formula of sample of test No. 9 was associated for the constitution of the filling, in a first case a syrup constituted by hydrogenated starch hydrolysate (H) of the preceding example, concentrated to 85% of dry matter and flavored, and in a second case, another hydrolysate with 82% of dry matter, which has the following composition:

| | |
|---|---|
| sorbitol | 15.2% |
| maltitol | 40.8% |
| products of DP comprised between 3 and 20 | 42.9% |
| products of DP higher than 20 | 1.1%. |

In the second case, the filling comprises, besides the hydrolysate which is present in the amount of 98% by weight, 2% by weight of a moistering agent constituted by polypropyleneglycol.

In the practice, the chewing-gum dough coming from the kneader at about 50° C. is rolled to a thickness of 2.5 mm and then cut up into rectangles of 30 cm×20 cm.

On one of the two halfes of the rectangle a layer of about 3 mm of syrup is spread, cooled to a temperature such that a viscosity is close to that of the strip of chewing-gum. The second half of the rectangle is then folded onto the syrup-coated half and the edges are carefully applied to one another to form a proper weld.

A punching machine enables the filled chewing gums to be cut up to their final size.

The filled chewing gums thus obtained have been stored at a relative humidity of 70% and at a temperature of 20° C. for three months.

Following this storage, it can be noticed that the filling has preserved the characteristics of fluidity and taste which it had at the time of its preparation.

As a result of which and whatever the embodiment adopted, there is thus provided an improved sugarless conventional chewing gum which, not only has:
a very high sweetening power,
excellent plasticity,
good flavoring and aroma retention and
complete resistance to the acidifying action of the bacteria of the mouth,
but, especially, is distinguished by an excellent stability.

We claim:

1. In a process for manufacturing a stable, non-cariogenic and sugarless chewing-gum comprising:
   the melting of a base gum,
   the mixing of this base gum with an aqueous softening agent selected within the group consisting of liquid sorbitol and aqueous solutions of vegetable gums,
   the addition to this mixture of solid sweetening agents comprising mannitol and at least one of the group consisting of sorbitol and xylitol,
   the rolling of the dough so obtained followed by putting it into the desired shape,
the improvement wherein at least part of the aqueous softening agent is substituted with an amount increasing from 5 to 35% by weight of a hydrogenated starch hydrolysate comprising:
   less than 3% of polyols of DP higher than 20,
   less than 60% of maltitol (DP 2) and
   less than 19% of sorbitol (DP 1),
   the balance to 100 being constituted by a mixture of polyols of DP 3 to 20,
and wherein, simultaneously to the said selection of an increasing proportion of hydrogenated starch hydrolysate, there is selected a decreasing proportion of mannitol, said proportion of mannitol being less than 10% by weight when the proportion of hydrolysate is higher than 10% by weight, less than 5% by weight and about 0 and even null when the proportion of hydrolysate is higher than 20% by weight.

2. In a process for manufacturing a stable, non-cariogenic and sugarless chewing-gum comprising:

the melting of a base gum, the mixing of this base gum with an aqueous softening agent selected within the group consisting of liquid sorbitol and aqueous solutions of vegetable gums, the addition to this mixture of solid sweetening agents comprising mannitol and at least one of the group consisting of sorbitol and xylitol, the rolling of the dough so obtained followed by putting it into the desired shape, the improvement wherein there is selected, for the substitution of at least part of the aqueous softening agent, an amount increasing from 5 to 35% by weight of a hydrogenated starch hydrolysate comprising:

less than 3% of polyols of DP higher than 20,
less than 60% of maltitol (DP 2) and
less than 14% of sorbitol (DP 1),
the balance to 100 being constituted by a mixture of polyols of DP 3 to 20, and wherein, simultaneously to the said selection of an increasing proportion of hydrogenated starch hydrolysate, there is selected a decreasing proportion of mannitol, said proportion of mannitol being less than 10% by weight when the proportion of hydrolysate is higher than 10% by weight, less than 5% by weight and about 0 and even null when the proportion of hydrolysate is higher than 20% by weight.

* * * * *